(12) United States Patent
Shoobridge

(10) Patent No.: US 7,185,816 B1
(45) Date of Patent: Mar. 6, 2007

(54) BAR CODE AND METHOD OF FORMING A BAR CODE HAVING COLOR FOR ENCODING SUPPLEMENTAL INFORMATION

(75) Inventor: Richard Allen Shoobridge, The Woodlands, TX (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 09/564,624

(22) Filed: May 4, 2000

(51) Int. Cl.
*G06K 7/10* (2006.01)

(52) U.S. Cl. .................. 235/462.04; 235/469
(58) Field of Classification Search .................
235/462.01–462.49, 469, 454, 494, 456,
235/461; 283/88
See application file for complete search history.

(56) References Cited

U.S. PATENT DOCUMENTS

| | | | | |
|---|---|---|---|---|
| 3,571,571 A | * | 3/1971 | Kapsambelis | 235/454 |
| 4,794,239 A | | 12/1988 | Allais | 235/462.1 |
| 4,889,367 A | * | 12/1989 | Miller | 283/88 |
| 5,270,522 A | | 12/1993 | Bone, Jr. | 235/375 |
| 5,290,033 A | * | 3/1994 | Bittner et al. | 463/25 |
| 5,304,786 A | | 4/1994 | Pavlidis et al. | 235/462.07 |
| 5,341,165 A | | 8/1994 | Suzuki et al. | 347/132 |
| 5,478,997 A | | 12/1995 | Bridgelall et al. | 235/462.25 |
| 5,489,767 A | * | 2/1996 | Billington | 235/437 |
| 5,576,528 A | * | 11/1996 | Chew et al. | 235/469 |
| 5,862,270 A | | 1/1999 | Lopresti et al. | 382/306 |
| 5,869,828 A | * | 2/1999 | Braginsky | 235/462.1 |
| 5,889,269 A | | 3/1999 | Bridgelall et al. | 235/462.32 |
| 5,936,742 A | | 8/1999 | Horiuchi et al. | 358/400 |
| 5,992,748 A | * | 11/1999 | Takahashi et al. | 235/462.04 |
| 6,032,861 A | * | 3/2000 | Lemelson et al. | 235/456 |
| 6,070,805 A | * | 6/2000 | Kaufman et al. | 235/494 |
| 6,375,075 B1 | * | 4/2002 | Ackley et al. | 235/462.04 |
| 6,398,117 B1 | * | 6/2002 | Oakeson et al. | 235/494 |
| 6,457,651 B2 | * | 10/2002 | Paul et al. | 235/494 |

FOREIGN PATENT DOCUMENTS

| | | | |
|---|---|---|---|
| JP | 62206695 A | * | 9/1987 |
| JP | 08096097 A | * | 4/1996 |
| WO | WO-9516576 A1 | * | 6/1995 |

\* cited by examiner

Primary Examiner—Jared J. Fureman
Assistant Examiner—Jamara A. Franklin
(74) Attorney, Agent, or Firm—Amin, Turocy, & Calvin, LLP

(57) ABSTRACT

A barcode symbol having an encoded symbology is provided with color or shades of gray to add additional information at the time of printing. The color or shades of gray provides the current barcode symbology with a third dimension of information. The color or shades of gray can encode information over a specific one-dimensional or two-dimensional symbology. White spaces can be replaced with colors or shades of gray to add coded information to the standard one-dimensional and two-dimensional codes. The number of colors and how they are distributed or arranged can provide the basic backbone of information. A barcode reader that can detect the different color spectrums, can be employed to decode the information. Furthermore, color is not limited to white spaces, but can be implemented into black spaces. Additionally, colored background information can provide additional information to the current symbology.

26 Claims, 8 Drawing Sheets
(4 of 8 Drawing Sheet(s) Filed in Color)

BAR CODE AND METHOD OF FORMING A BAR CODE HAVING COLOR FOR ENCODING SUPPLEMENTAL INFORMATION

TECHNICAL FIELD

The present invention relates to barcodes and more particularly to one dimensional and two dimensional barcodes that implement color as an additional dimension.

BACKGROUND OF THE INVENTION

Barcodes have become a widely accepted method for automatically identifying and tracking objects. A barcode symbol is typically an array of encoded elements that are printed directly on an object surface or on labels affixed to an object surface. Barcode symbols are typically read by optical techniques, such as by readers implementing scanning laser beams or handheld wands. Barcode symbols typically comprise bars and spaces with bars of varying widths representing strings of binary ones and spaces of varying widths representing binary zeros. The specific arrangement of bars or elements in a barcode symbol defines the character represented by the barcode symbol according to a set of rules and definitions specific to the code. This is referred to as the symbology of the code. The size of the bars and spaces is determined by the type of code used, as is the actual size of the bars and spaces. The number of characters per inch represented by the barcode symbol is referred to as the density of the symbol.

A desired sequence of characters are encoded based on a specific symbology to form a complete symbol. Some symbologies include start characters, stop characters and error checking characters. A variety of different symbologies have been developed. For, example, one-dimensional codes include UPC/EAN, Code 39, Code 128, Codabar and Interleaved 2 of 5. In order to increase the amount of data that can be represented in a symbol, two dimensional symbologies have been developed. A two-dimensional code standard known as Code 49 provides a two-dimensional concept of stacking rows of characters vertically instead of extending symbols bars horizontally. Another two-dimensional code is known as VERICODE (a trademark of VIRITEC Corporation), which is a checkerboard-like pattern of black or white square units. Some two-dimensional barcode symbologies (e.g., code 93) are merely extensions of one-dimensional symbologies. Some two-dimensional symbologies implement character recognitions systems (e.g., TEMA code). Regardless of the symbology being employed, the ultimate goal is to provide a barcode symbol that can maximize the amount of information encoded in the barcode symbol. However, even with the use of two-dimensional barcodes and improved symbologies, conventional barcode symbols cannot retain a sufficient amount of information.

Accordingly, there is a strong need in the art for a barcode symbol that can retain more information than conventional one-dimensional and two-dimensional symbologies.

SUMMARY OF THE INVENTION

According to a preferred aspect of the present invention, a barcode symbol having an encoded symbology is provided with color or shades of gray to add additional information at the time of printing. The color or shades of gray provides the current barcode symbology with a third dimension of information, which can include manufacturing information, customer information, delivery information, lot numbers, delivery dates in addition to providing specific information on the type of symbology being employed. The color or shades of gray can encode information over a specific one-dimensional or two-dimensional symbology. White spaces can be replaced with colors or shades of gray to add coded information to the standard one-dimensional and two-dimensional codes. The number of colors and how they are distributed or arranged can provide the basic backbone of information. A barcode reader that can detect the different color spectrums, can be employed to decode the information. Furthermore, color is not limited to white spaces, but can be implemented into black spaces. Additionally, colored background information can provide additional information to the current symbology.

Thus, according to one aspect of the present invention, a barcode structure is provided. The barcode structure comprises at least one pattern including data encoded according to a barcode symbology and at least one color including encoded data. The data encoded into the at least one color can be separate from the data encoded into the barcode symbology. The data encoded into the at least one color can be integrated into the barcode symbology and provide the barcode symbology with the ability to encode data additional to the data that the barcode symbology has the ability to encode alone. The at least one pattern can comprise a plurality of one-dimensional bars and spaces wherein either the spaces or the bars include the at least one color. The at least one pattern can comprise at least one two-dimensional pattern of boxes wherein the boxes include the at least one color. Alternatively, the at least one color can form a part of the background. The at least color preferably comprises a plurality of different colors. However, the at least one color can comprise various shades of gray.

In accordance with another aspect of the present invention, a method of forming a barcode structure is provided. The method comprises the steps of encoding data into a barcode symbology and encoding additional data into at least one color. The method can also include the steps of printing the barcode structure onto an object. The barcode structure can include at least one pattern comprising a plurality of one-dimensional bars and spaces wherein either the spaces or the bars can include the at least one color. The barcode structure can include at least one two-dimensional pattern of boxes wherein the boxes include the at least one color. Alternatively, the at least one color can form a part of the background. The at least color preferably comprises a plurality of different colors. However, the at least one color can comprise various shades of gray.

In accordance with yet another aspect of the present invention, a method of adding a dimension to a barcode symbology is provided. The method includes the steps of providing a barcode symbology and providing color coding into the barcode symbology. The barcode symbology can be either a one-dimensional symbology or a two-dimensional symbology. The color coding can include at least two different colors or at least two different shades of gray. The method can further comprise the step of encoding data and printing the encoded data according to the barcode symbology and the color coding onto an object. The encoded data can include at least one pattern comprising a plurality of one-dimensional bars and spaces wherein either the spaces or the bars can include at least one color. The encoded data can comprise at least one two-dimensional pattern of boxes wherein the boxes include at least one color. The encoded data can comprise at least one two-dimensional pattern of boxes wherein at least one color forms a part of the background.

In accordance with another aspect of the present invention, a method is provided of encoding a barcode structure having a barcode symbology and color coding. The method comprises the steps of reading the barcode, decoding the barcode data encoded into the barcode symbology and the color coding and processing the decoded data. The barcode symbology can be either a one-dimensional symbology or a two-dimensional symbology. The color coding can be separate from the barcode symbology or integrated into the barcode symbology. The method can further includes the steps of decoding the color data separate from decoding the barcode symbology and storing one of the decoded color data and decoded barcode symbology data prior to the step of processing.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

The file of the patent contains at least one drawing executed in color. Copies of this patent with color drawing(s) will be provided by the Patent and Trademark Office upon request and payment of the necessary fee.

DETAILED DESCRIPTION OF THE INVENTION

Figure 1A:
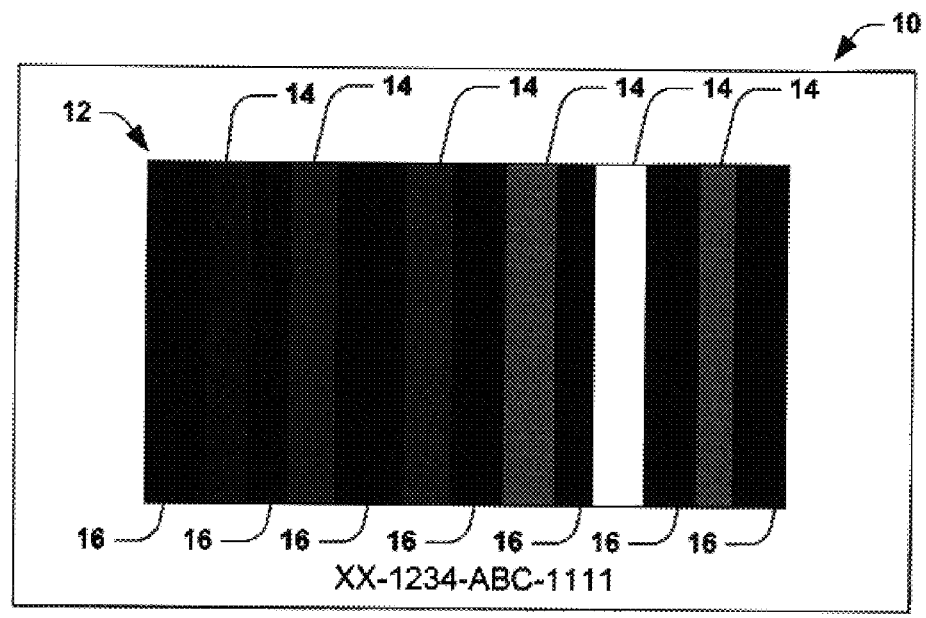
FIG. 1a illustrates a front view of a label having a one-dimensional barcode with color in accordance with one aspect of the present invention.

The present invention will now be described with reference to the drawings, wherein like reference numerals are used to refer to like elements throughout. The present invention will be described with reference to one-dimensional and two-dimensional barcodes provided with colors or shades of gray as a third dimension. The color or shades of gray can be implemented onto a given barcode symbology or integrated into a barcode symbology. The barcode can be encoded with data and decoded by a reader that recognizes color. It should be understood that the description of these embodiments are merely illustrative and that they should not be taken in a limiting sense.

Figure 1B:
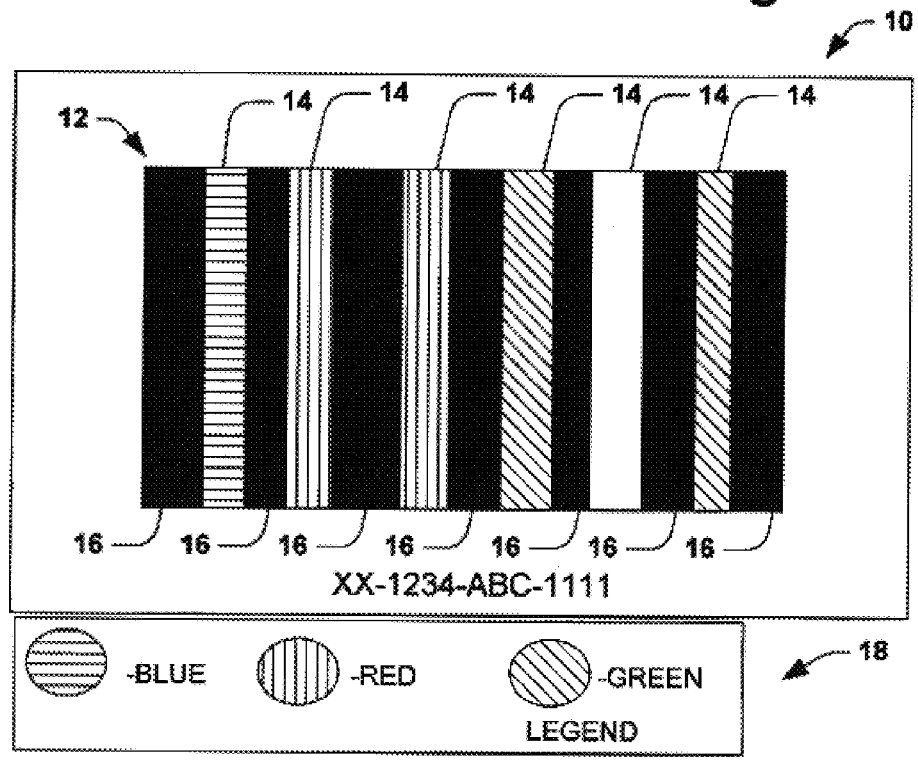
FIG. 1b illustrates a front view of the label of FIG. 1a with color illustrated with patterned symbols and a legend in accordance with one aspect of the present invention.

FIGS. 1a–1b illustrate a front view of a label 10 including a one-dimensional barcode 12 printed thereon. FIG. 1a illustrates the actual colors included in the barcode 12, while FIG. 1b illustrates the colors by patterned symbols defined by a legend 18. The barcode 12 includes a number of black bars 16 and spaces 14 of varying widths patterned according to a symbology. The pattern 12 is provided as an example of a symbology and is not meant to be patterned to follow any particular symbology. It is to be appreciated that any one-dimensional symbology, such as UPC, code 39, Code 128 or Codabar may be employed to carry out the present invention. As shown in FIGS. 1a –1b, the spaces have a pattern of colors in addition to the patterned black bars 16. Barcode 12 includes a pattern of spaces having the colors blue, red, red, green, white and green. These colors can represent data such as a manufacturers code, delivery dates, expirations dates, vendor identification, lot numbers or any number of data not included in the black bar pattern of the barcode. The present example includes four colors within six spaces providing the barcode with 4096 (i.e., $4^6$) possible patterns. These 4096 possible patterns can represent different data encoded into the barcode. Alternatively, these different patterns can be integrated into any given one-dimensional symbology. For example, if a symbology includes 5000 different combinations by implementing a single color with white within six spaces increases the possible combinations to 64 (i.e., $2^6$)*5000 or 320,000. Adding or Integrating color into a given symbology, not only substantially increases the amount of data that can be encoded into a barcode, but also provides for a substantial decrease in the size of any given barcode.

It is to be appreciated that the present example can include any number of colors implemented into the spaces only limited by the ability of the reader to differentiate between colors. Additionally, several rows of colors can be disposed within a single space forming a variety of patterns within the space only limited by the resolution of the reader.

Figure 2A:
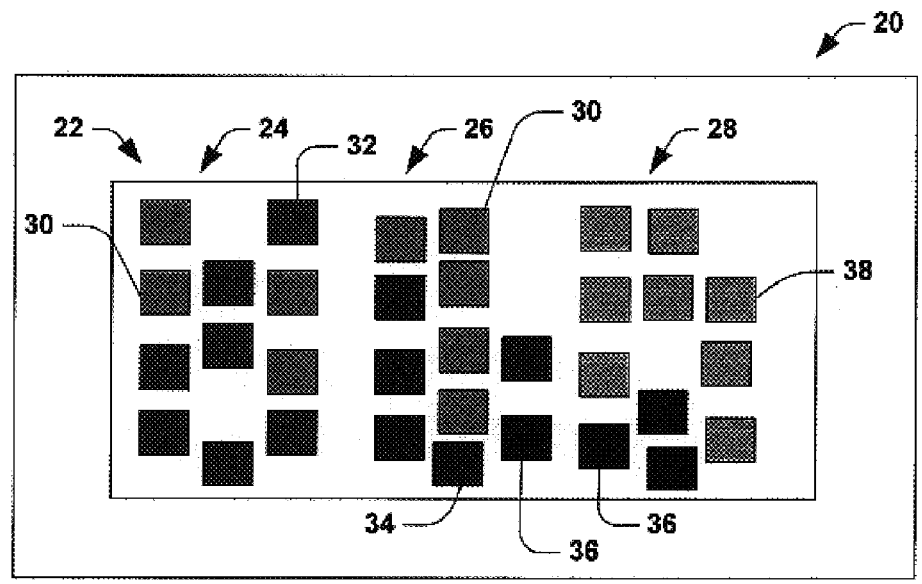
FIG. 2a illustrates a front view of a label having a two-dimensional barcode with colored boxes in accordance with one aspect of the present invention.
Figure 2B:
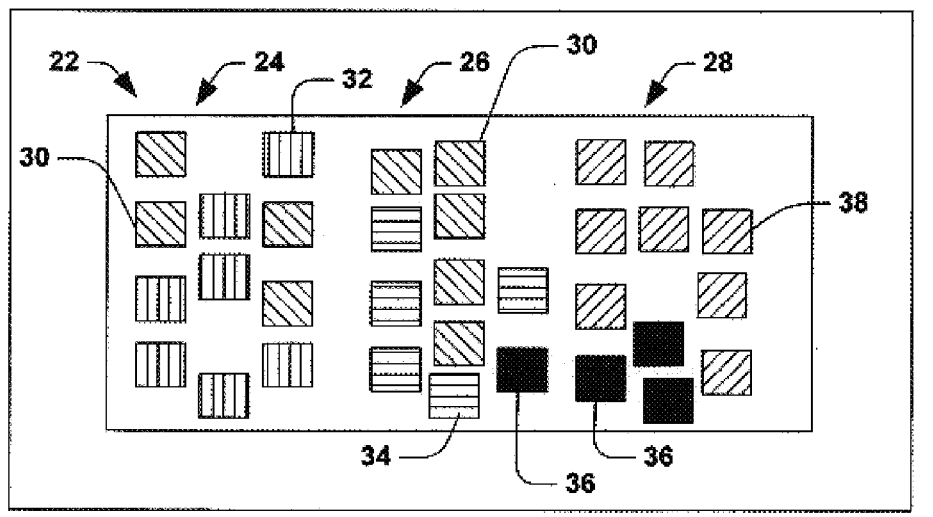
FIG. 2b illustrates a front view of the label of FIG. 2a with color illustrated with patterned symbols and a legend in accordance with one aspect of the present invention.
Figure 2B:
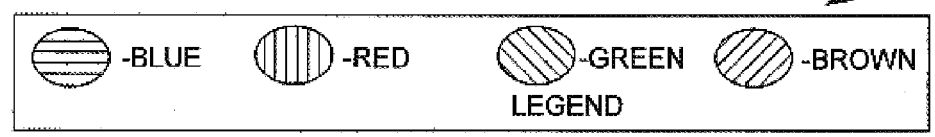

FIGS. 2a–2b illustrate a front view of a label 20 including a two-dimensional barcode 22 printed thereon. FIG. 2a illustrates the actual colors included in the barcode 22, while FIG. 2b illustrates the colors by patterned symbols defined by a legend 40. The barcode 22 includes a number of boxes forming a first pattern 24, a second pattern 26 and a third pattern 28. The first pattern 24 includes a number of green boxes 30 and a number of red boxes 32. The second pattern 30 includes green boxes 30, a number of blue boxes 34 and a black box 36. The third pattern includes black boxes 36 and a number of gold boxes 38. The patterns 24, 26 and 28 are provided as an example of a symbology and are not meant to be patterned to follow any particular symbology. It is to be appreciated that any two-dimensional symbology, such as VERICODE (a trademark of VIRITEC Corporation), code 93 or TEMA code may be employed to carry out the present invention. As shown in FIGS. 2a–2b, the boxes form patterns of a two dimensional symbology. The patterns include the colors green, red, blue black and brown. These colors can represent additional data such as a manufacturers code, delivery dates, expirations dates, vendor identification, lot numbers or any number of data types not included in the symbology pattern. The present example includes five colors of boxes and a large number of additional pattern types. The colors can add data separate from the symbology or can be integrated into the symbology to enhance the amount of data that can be encoded into the two-dimensional symbology. Any number of colors can be implemented into the two-dimensional pattern only limited by the ability of the reader being utilized to read the barcode 22.

Figure 3A:
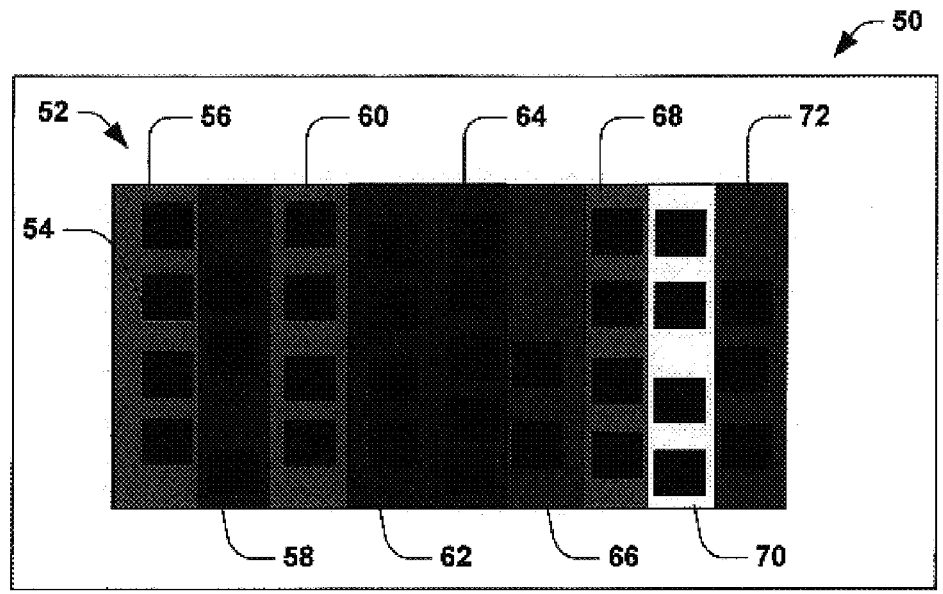
FIG. 3a illustrates a front view of a label having a barcode with a plurality of patterned columns with colored backgrounds in accordance with one aspect of the present invention.
Figure 3B:
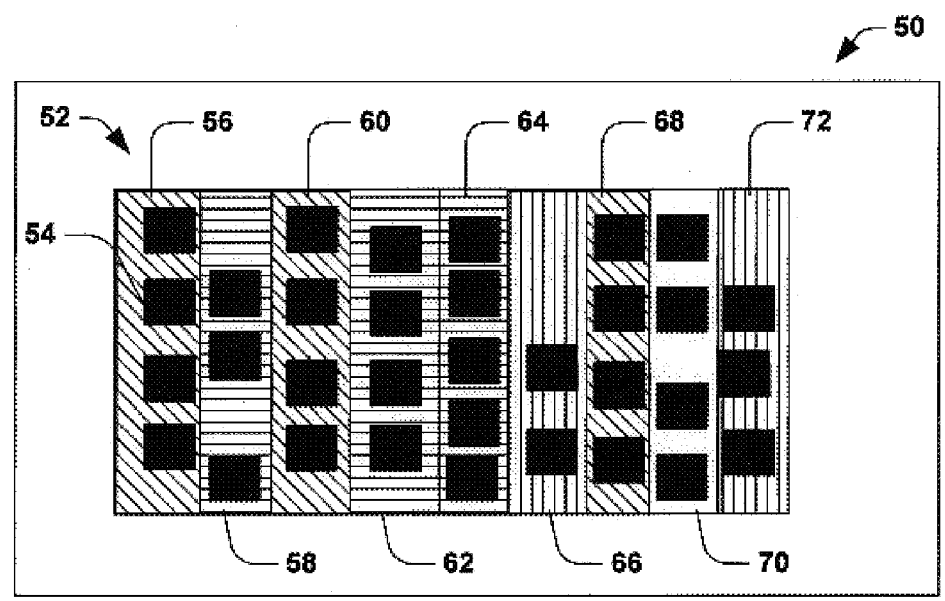
FIG. 3b illustrates a front view of the label of FIG. 3a with color illustrated with patterned symbols and a legend in accordance with one aspect of the present invention.
Figure 3B:
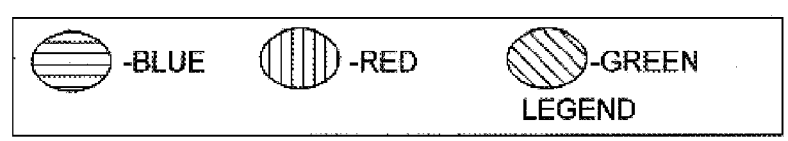

FIGS. 3a–3b illustrate a front view of a label 50 including a two-dimensional barcode 52 printed thereon. FIG. 3a illustrates the actual colors included in the barcode 52, while FIG. 3b illustrates the colors by patterned symbols defined by a legend 80. The barcode 52 includes a number of boxes 54 forming a plurality of columns. Each column includes a colored background. In particular, columns 56, 60 and 68 include a green background, columns 60, 62 and 64 include a blue background, columns 66 and 72 include a red background and column 70 includes a white background. The columns of boxes 54 can form two-dimensional patterns of a two-dimensional symbology or the individual boxes and grouping of boxes can form a two-dimensional symbology. The colors can serve as a barcode background pattern that includes additional encoded data therein separate from the two-dimensional symbology. Additionally, the barcode background pattern can give the individual columns an ability to provide additional combinations of columns or different patterns for a given box pattern (e.g., three columns making up a pattern) adding to the current two-dimensional symbology.

Figure 4A:
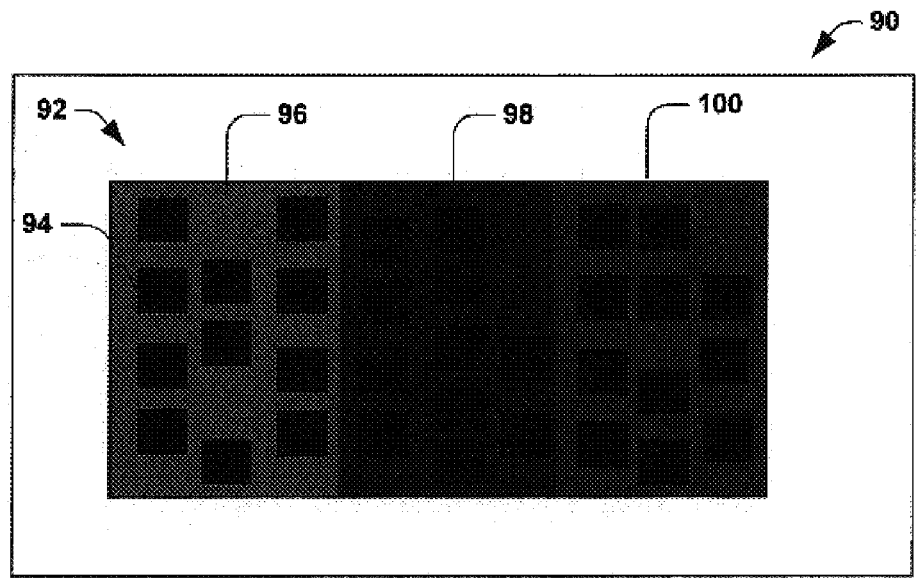
FIG. 4a illustrates a front view of a label having a barcode with a plurality of two-dimensional patterns with colored backgrounds in accordance with one aspect of the present invention.
Figure 4B:
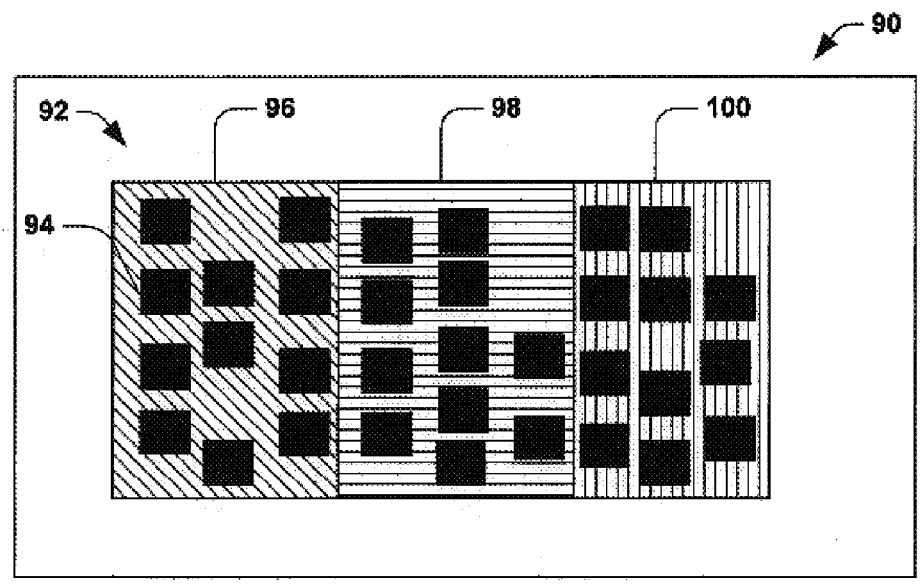
FIG. 4B illustrates a front view of the label of FIG. 4a with color illustrated with patterned symbols and a legend in accordance with one aspect of the present invention.
Figure 4B:
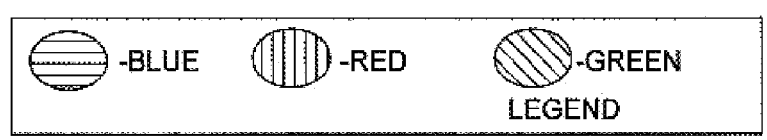

FIGS. 4a–4B illustrate a front view of a label 90 including a two-dimensional barcode 92 printed thereon. FIG. 4a illustrates the actual colors included in the barcode 92, while FIG. 4B illustrates the colors by patterned symbols defined by a legend 102. The barcode 92 includes a number of boxes 94 forming a plurality of patterns. Each pattern includes a colored background. In particular, a first pattern 96 includes a green background, a second pattern 98 include a blue background and a third color 100 includes a red background. The patterns 96, 98 and 100 of boxes 94 can be any two-dimensional symbology. The colors can serve as a barcode background pattern that includes additional encoded data therein separate from the two-dimensional symbology. Additionally, the barcode background pattern can give the individual patterns an ability to provide additional data to the current two-dimensional symbology.

Figure 5A:
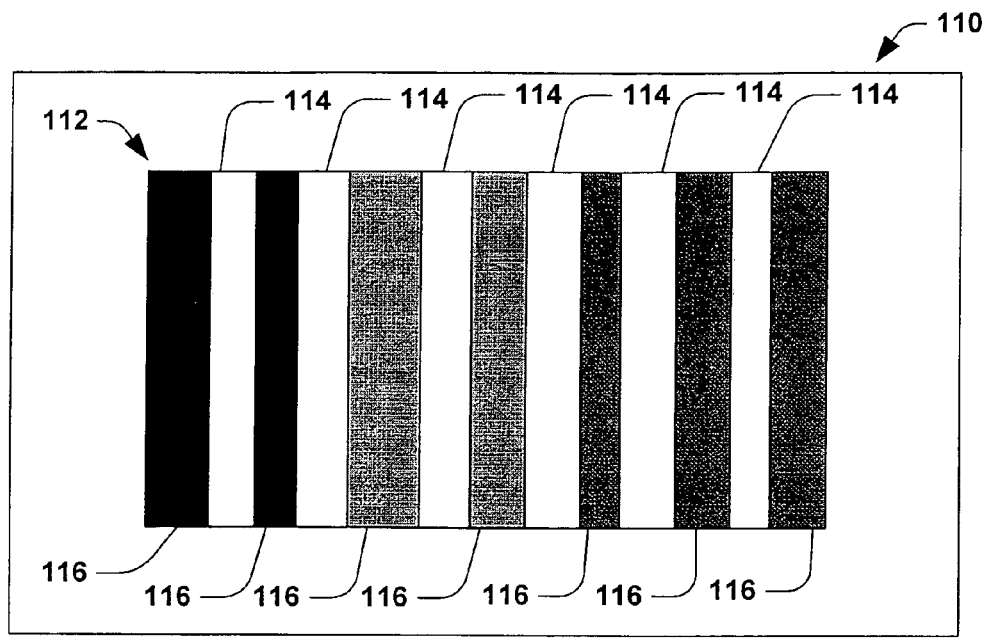
FIG. 5a illustrates a front view of a label having a one-dimensional barcode with different shades of gray in the spaces in accordance with one aspect of the present invention.

It is to be appreciated that the present invention is not limited to color, but different shades of gray may be employed to add the ability to encode additional data to a barcode or increase the ability of a current symbology to encode additional data. FIG. 5a illustrates a front view of a label 110 including a one-dimensional barcode 112 printed thereon. The barcode 112 includes a number of bars 116 and spaces 114 of varying widths patterned according to a symbology. The barcode pattern 112 is provided as an example of a symbology and is not meant to be patterned to follow any particular symbology. It is to be appreciated that any one-dimensional symbology, such as UPC, code 39, Code 128 or Codabar may be employed to carry out the present invention. As shown in FIG. 5a, the bars 116 have a pattern of black and different shades of gray. The black and different shades of gray can represent additional data such as a manufacturers code, delivery dates, expirations dates, vendor identification, lot numbers or any number of data types not included in the symbology pattern.

Figure 5B:
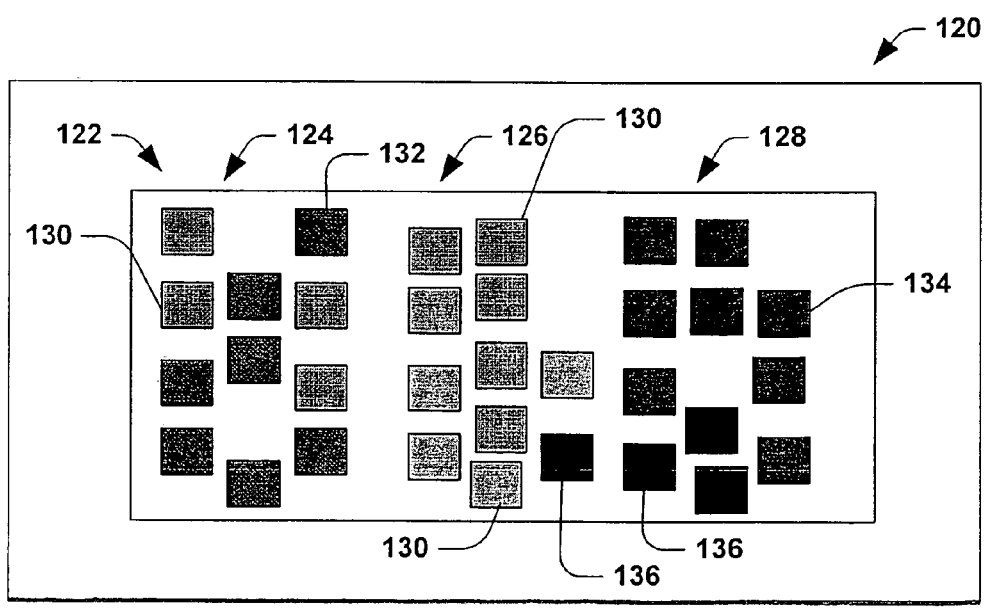
FIG. 5b illustrates a front view of a label having a two-dimensional barcode with boxes having different shades of gray in accordance with one aspect of the present invention.

FIG. 5b illustrates a front view of a label 120 including a two-dimensional barcode 122 printed thereon. The barcode 122 includes a number of boxes forming a first pattern 124, a second pattern 126 and a third pattern 128. The first pattern 124 includes a number of boxes of a first shade of gray 130 and a number of boxes of a second shade of gray 132. The second pattern 130 includes a number of boxes of the first shade of gray 130 and a black box 136. The third pattern 128 includes black boxes 136 and a number of boxes of a third shade of gray 134. The patterns 124, 126 and 128 are provided as an example of a symbology and are not meant to be patterned to follow any particular symbology. It is to be appreciated that any two-dimensional symbology, such as VERICODE (a trademark of VIRITEC Corporation), code 93 or TEMA code may be employed to carry out the present invention. As shown in FIG. 5b, the boxes form patterns of a two dimensional symbology. The patterns include black and three different shades of gray that can represent additional data such as a manufacturers code, delivery dates, expirations dates, vendor identification, lot numbers or any number of data not included in the symbology pattern. The shades of gray can add data separate from the symbology or can be integrated into the symbology to enhance the amount of data that can be encoded into the two-dimensional symbology. Any number of shades of gray can be implemented into the two-dimensional pattern only limited by the ability of the reader to distinguish between the shades of gray.

Figure 6:
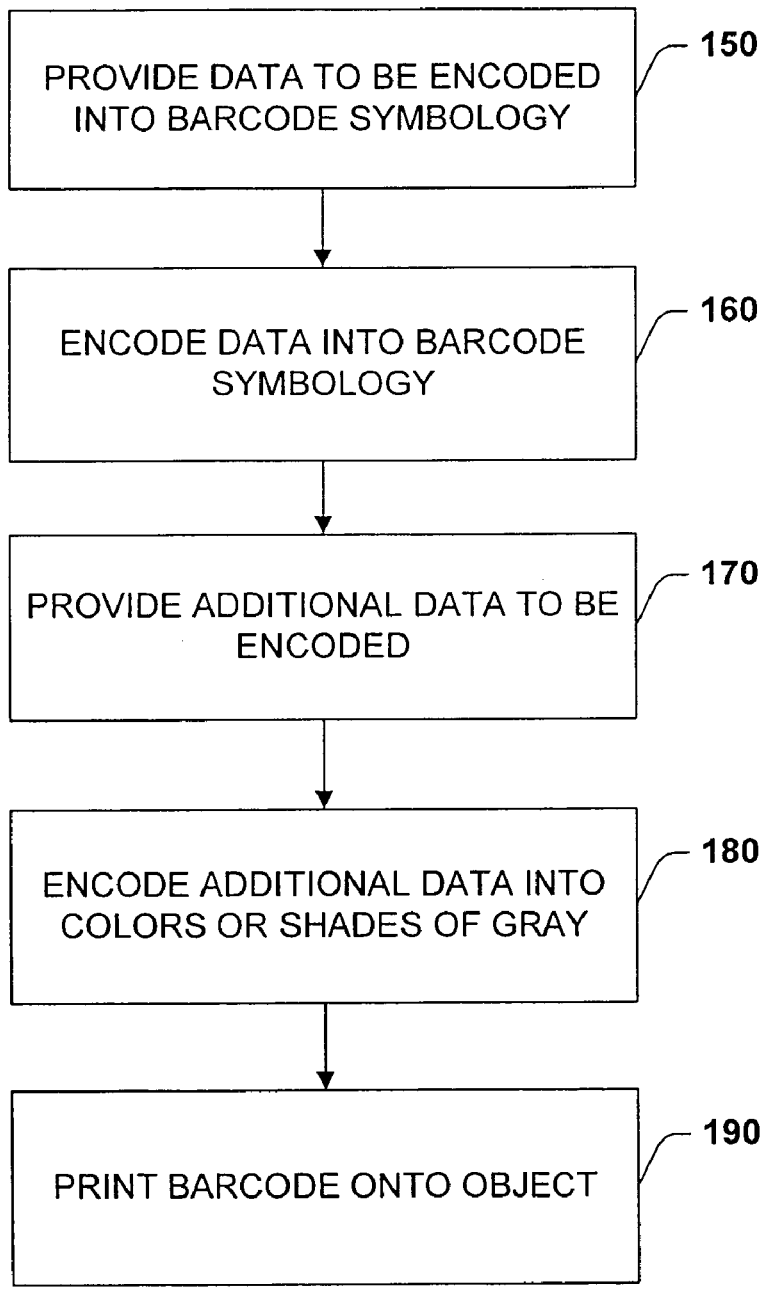
FIG. 6 illustrates a flow diagram for one specific methodology for encoding data into a barcode having color in accordance with the present invention.
Figure 7:
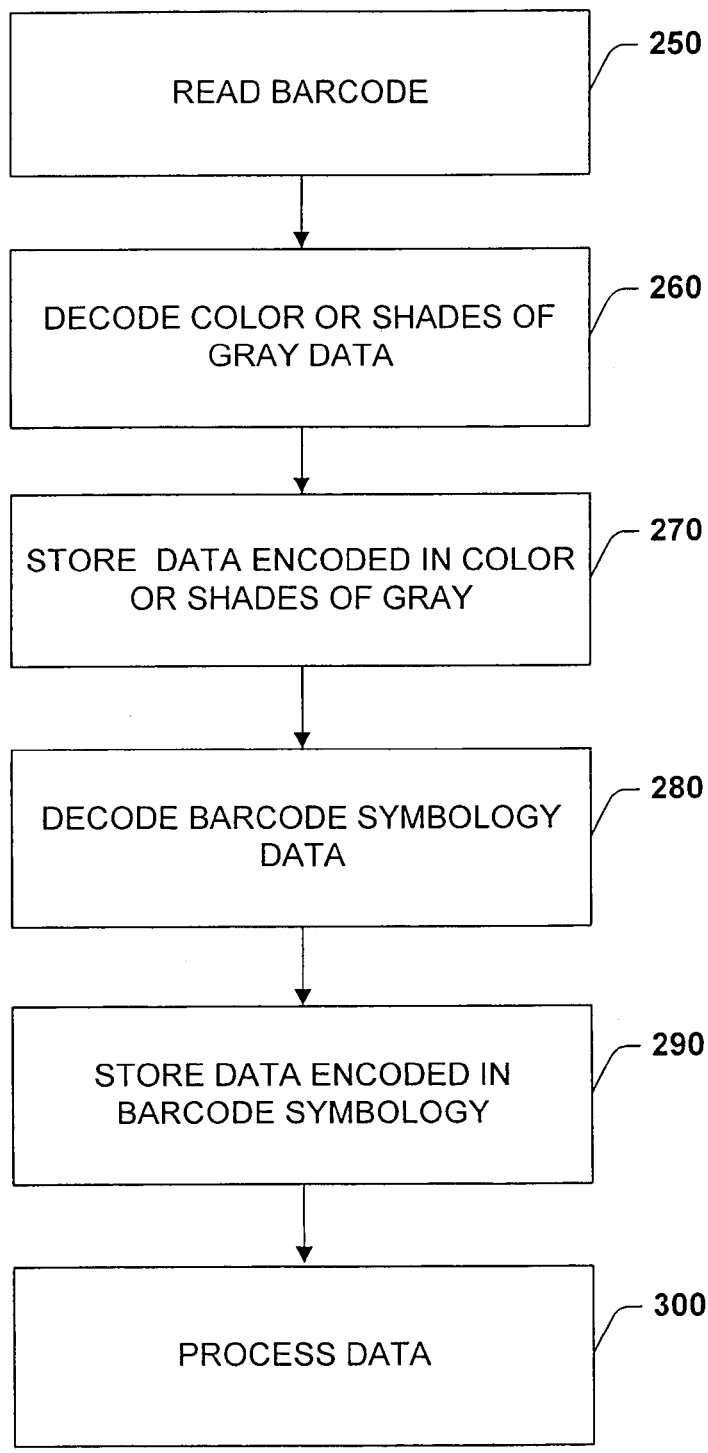
FIG. 7 illustrates a flow diagram for one specific methodology for decoding data from a barcode having color in accordance with the present invention.

FIG. 6 illustrates a methodology for adding data encoded into colors to a barcode. Beginning in step 120, data is provided to be encoded into a barcode symbology. The symbology can be either one-dimensional or two-dimensional. In step 160, the data is encoded into the barcode symbology. In step 170, additional data is provided to be encoded. The additional data is then encoded into colors or shades of gray in step 180. The colors or shades of gray can be encoded into the black bars, white spaces, black boxes or background of the barcode. After all of the data is encoded into the barcode, the barcode is printed onto an object in step 190. FIG. 7 illustrates a methodology for reading the barcode encoded in FIG. 6. Beginning in step 250, the barcode is read by a barcode reader that can understand the barcode symbology and differentiate between colors or shades of gray. In step 260, the barcode reader decodes the color or shades of gray from the encoded data. In step 270, the data encoded that was in the color or shades of gray is stored for later processing. In step 280, the data encoded in the barcode symbology is decoded. In step 290, that data decoded from the data encoded in the barcode symbology is stored for later processing. The data decoded from the color and the barcode symbology is then processed in step 300.

Figure 8:
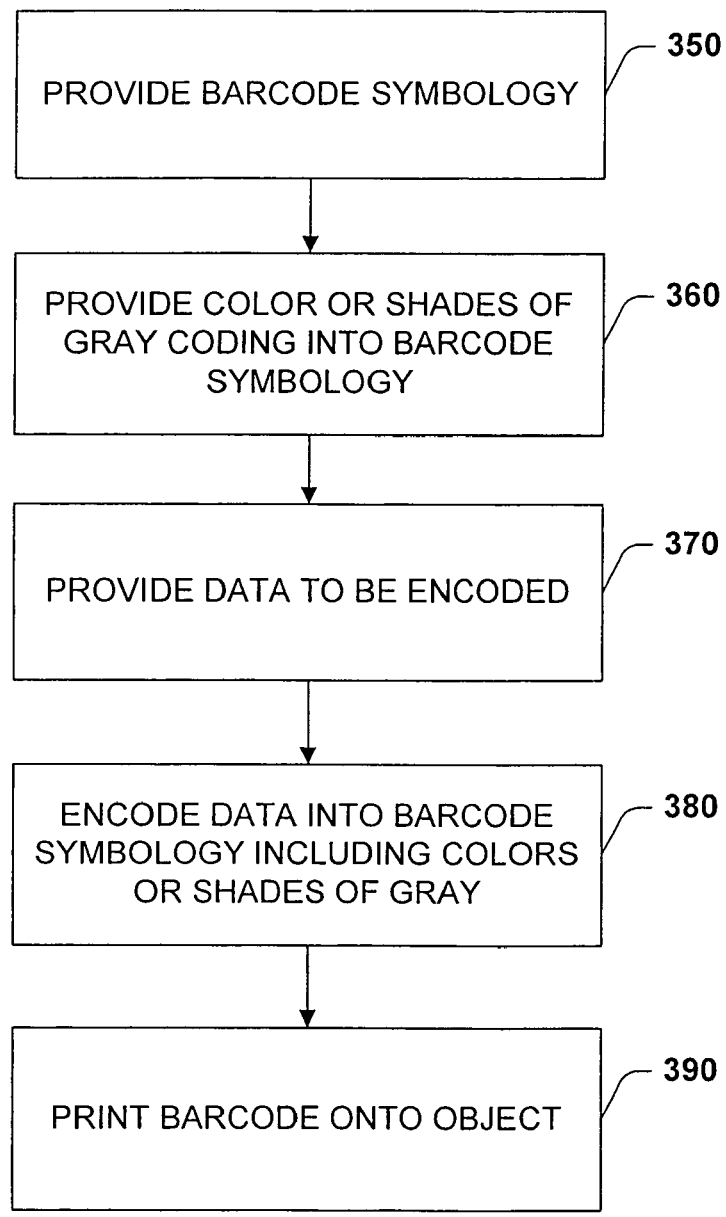
FIG. 8 illustrates a flow diagram for one specific methodology for adding a dimension to a barcode symbology by utilizing color in accordance with the present invention.

FIG. 8 illustrates a methodology for adding color to a barcode symbology for increasing the amount of data that can be encoded into the barcode symbology. Beginning in step 350, a barcode symbology is provided. The symbology can be either one-dimensional or two-dimensional. In step 360, color or shades of gray are provided for encoding into the barcode symbology. In step 370, data is provided to be encoded. The data is then encoded into the barcode symbology including the colors or shades of gray in step 380. After all of the data is encoded into the barcode, the barcode is printed onto an object in step 390.

The invention has been described with reference to the preferred embodiments. Obviously, modifications and alterations will occur to others upon reading and understanding the preceding detailed description. It is intended that the invention be construed as including all such modifications alterations, and equivalents thereof.

What is claimed is:

1. A barcode structure comprising:
   a background area that provides for a barcode to be printed thereon, the background area comprising a plurality of colors, at least one of the plurality of colors other than black and white; and
   a barcode symbol printed on the background area, the barcode symbol comprising a plurality of different colored bars, at least one color disposed between two of the different colored bars, each different colored bar divided into a plurality of sections such that each section comprises one or more disparate colors other than black and white, and each section incorporates encoded data.

2. The barcode structure of claim 1, the plurality of colors in the background area are disposed between two different colored bars of the bar code symbol.

3. The barcode structure of claim 2, the plurality of colors includes blue, red, green, brown, and gray.

4. The barcode structure of claim 1, the at least one of the plurality of colors associated with the background area adds an exponential amount of possible patterns to represent different data encoded into the barcode structure.

5. The barcode structure of claim 1, the bar code symbol further comprising a two-dimensional pattern of boxes located between two of the different colored bars and over the background area.

6. The barcode structure of claim 5, the plurality of colors including at least one of blue, red, green, brown, and gray.

7. The barcode structure of claim 1, the at least one of the plurality of colors comprises at least two different shades of gray.

8. A barcode structure comprising:
   a background area that provides for a barcode to be printed thereon, the background area comprising a plurality of colors, at least one of the plurality of colors other than black and white; and
   a plurality of different colored boxes printed on the background area to form at least one pattern according to a two-dimensional bar code symbology, the different colored boxes other than black and white, each hue in the different colored boxes provides encrypted data.

9. The barcode structure of claim 8, the at least one of the plurality of colors includes at least one of the colors blue, red, green, brown, and gray.

10. The barcode structure of claim 8, the at least one of the plurality of colors includes at least two different shades of gray.

11. The barcode structure of claim 8, the plurality of different colored boxes form a plurality of different patterns, each pattern including boxes of two different colors, at least one of the colors is other than black and white.

12. A barcode structure comprising:
    a background area that provides for a barcode to be printed thereon, the background area comprising a plurality of colors, at least one of the plurality of colors other than black and white; and
    a plurality of different colored boxes printed on the background area to form a plurality of columns as part of a bar code symbol, at least one color disposed between two of the plurality of different colored boxes, the different colored boxes other than black and white, each different colored box encapsulates enciphered data.

13. The barcode structure of claim 12, the plurality of colors include a color of at least one of green, blue, red, and gray.

14. The barcode structure of claim 12, the different colored boxes form two-dimensional patterns of a two-dimensional symbology.

15. The barcode structure of claim 12, individual different colored boxes or a grouping of different colored boxes can form a two-dimensional symbology.

16. The barcode structure of claim 12, the background area provides additional combinations of colored boundaries.

17. A method of forming a barcode structure comprising:
    encoding data into a background area of a bar code structure, the background area comprising a plurality of colors, at least one of the plurality of colors other than black and white; and
    encoding additional data into a barcode symbol printed on the background area, the barcode symbol comprising a plurality of different colored bars and at least one color disposed between two of the different colored bars, each different colored bar speckled with spectral colors other than black and white, each speckle comprises additional encoded data.

18. The method of claim 17, further comprising encoding at least one two-dimensional pattern of boxes as part of the barcode symbol, the boxes include the at least one color.

19. The method of claim 17, further comprising encoding extra data into the bar code symbol via at least two different shades of gray.

20. A method of forming a barcode structure comprising:
    encoding a plurality of different colored boxes according to a barcode symbology over a background, each different colored box comprises two or more colors other than black and white; and
    providing color coding into the background, the color coding includes colors other than black and white.

21. The method of claim 20, the plurality of different colored boxes form a plurality of columns and the color coding is disposed between the columns.

22. The method of claim 20, the plurality of different colored boxes are color coded.

23. The method of claim 20, the plurality of different colored boxes form a plurality, of columns, each column including different colored boxes of two different colors, at least one of the colors being other than black and white.

24. The method of claim 20, the color coding includes at least two different shades of gray.

25. The method of claim 20, the color coding includes at least one of blue, red, green, brown, and gray.

26. The method of claim 20, further comprising decoding the barcode structure.

* * * * *